UNITED STATES PATENT OFFICE.

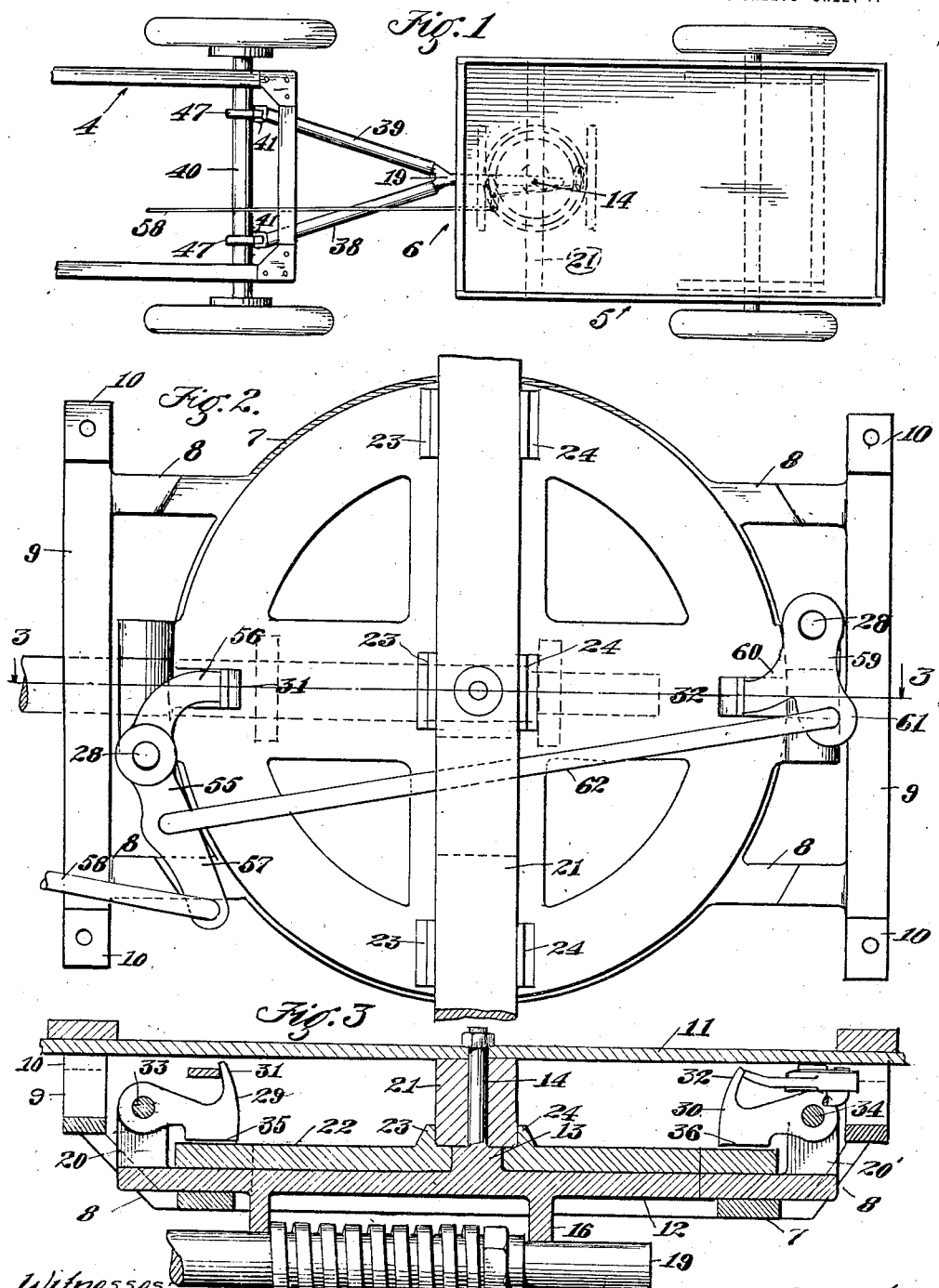

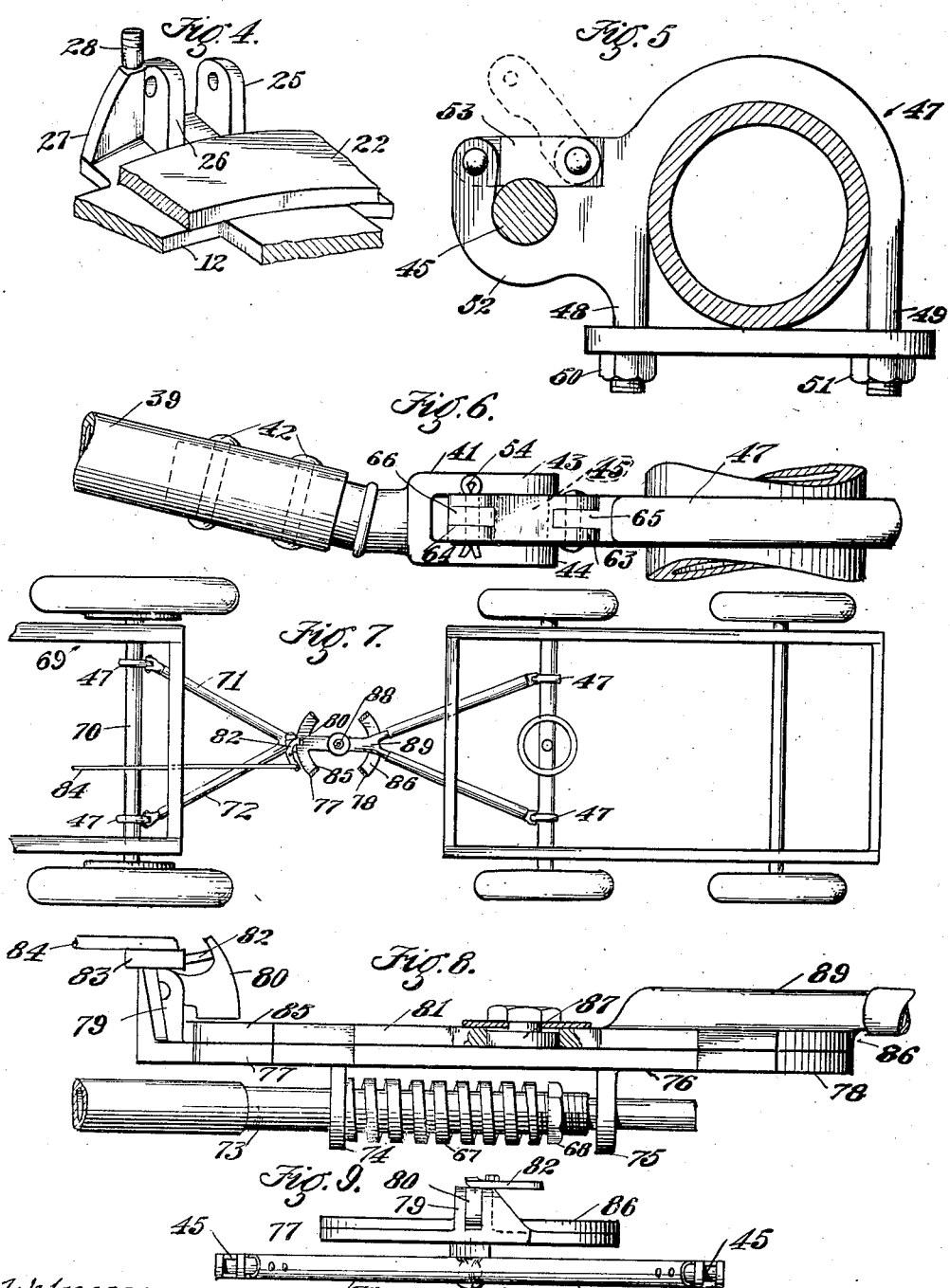

NICK W. KLINE, OF LOS ANGELES, CALIFORNIA.

COUPLING CONSTRUCTION FOR TRACTORS AND TRAILERS.

1,186,482.  Specification of Letters Patent.  Patented June 6, 1916.

Application filed February 8, 1915. Serial No. 6,898.

*To all whom it may concern:*

Be it known that I, NICK W. KLINE, a citizen of the United States, residing at Los Angeles, in the county of Los Angeles and State of California, have invented new and useful Improvements in Coupling Constructions for Tractors and Trailers, of which the following is a specification.

My invention relates to a coupling construction for tractors and trailers, and is especially adapted to the coupling of tractors having axles of the ordinary type.

It is an object of my invention to provide in a coupling a simple turn table, the turning plates of which may be locked in any desired position.

It is a further object of my invention to provide locking means for the coupling turn table which can be conveniently and quickly operated by the driver from his seat.

A still further object of my invention is the provision of a resilient connection between the coupling rods and turn table, thus doing away with the jar and shock caused by starting, stopping, changing speed, or when obstructions are encountered on the road.

A still further object of my invention is to provide a coupling construction of few parts, strong, durable, readily attached to and detached from vehicles of the type in common use, and requiring no tools or special construction of the vehicles.

Heretofore tractors and trailers have been coupled by mounting a turn table on the front axle of the trailer attaching the tongue thereto and securing the tongue to the frame or axle of the tractor. This method is crude and unsatisfactory as the trailer does not always follow the path of the tractor, and no means is provided for guiding the trailer when backing.

Another construction which has been used is that employing a turn table mounted on the frame of the tractor and to which the trailer is secured. This method of construction requires a special tractor.

My invention overcomes the disadvantages of the older constructions described above by providing a coupling which is braced against the side movement with respect to the axle of the tractor, which causes the trailer to follow in the path of the tractor, and requires no special construction of either the tractor or trailer.

Referring to the accompanying drawings: Figure 1 is a plan view of a two-wheeled trailer secured to a tractor by my improved coupling. Fig. 2 is an enlarged plan view of my coupling. Fig. 3 is a cross section on line 3—3 of Fig. 2 showing the locking levers in elevation. Fig. 4 is a perspective view of a detail of the turning table. Fig. 5 is a vertical section through an axle showing in elevation the means for connecting the coupling rods and axle. Fig. 6 is a plan view of the detail shown in Fig. 5. Fig. 7 illustrates in plan view a four-wheeled trailer connected to a tractor by means of a modified form of my coupling. Fig. 8 is an elevation of the coupling shown in Fig. 7. Fig. 9 is a front elevation of the coupling shown in Fig. 7.

Referring to the drawings, and more particularly to Figs. 1, 2 and 3 which illustrate a preferred form of my coupling, 4 indicates a tractor which may be an automobile, wagon or vehicle of any well known type and to which is secured a trailer 5 by means of my improved coupling 6. More specifically, my coupling comprises a supporting plate 7 of ring form secured by arms 8 to cross bars 9 having upstanding lugs 10 adapted for attachment to the trailer body or frame 11. Mounted for free rotation on ring 7 and concentric therewith is a cylindrical plate 12. Secured to the center of the plate, and preferably integral therewith is a trunnion member 13 which is reduced in diameter at the end to form a king bolt 14. On the lower side of plate 12 are depending lugs 15 and 16 having alined apertures 17 and 18 for loosely receiving a rod 19. On the upper part of the plate 12 and secured at diametrically opposite points to the periphery are standards 20 and 20'. Secured to the vehicle body or frame 11 is a cross bar 21. This bar has flat side faces and is preferably rectangular in cross section. At the center thereof is an aperture in which the king bolt 14 is rotatably mounted. A circular plate 22 is mounted for rotation relative to and upon the plate 12. Adjacent the center thereof are upstanding lugs 23 and 24 having faces formed to engage the bar 21 and prevent rotation of the plate 22 relative to the trailer.

Referring more particularly to Fig. 4, the standards 20 and 20' include upstanding ears 25 and 26 apertured to receive a pin. A wall 27 extends at substantially right angles to ear 26 and has upstanding and preferably integral therewith a pin 28 which is threaded at its end for the reception of a nut. This pin serves as a journal for a level which is mounted thereon. Levers 29 and 30 having arms 31 and 32 outstanding therefrom are pivoted by pins 33 and 34 to standards 20 and 20′ and have faces 35 and 36 for engagement with the plate 22 so that when forced against said plate the latter frictionally clutches plate 12, thus locking the two plates against rotation. By locking plates 22 and 12 together the trailer is locked against swinging relative to the tractor. Pivoted on pin 28 of standard 20 is a lever 55 of bell crank form, one end 56 engaging the arm 31 of lever 29, and the opposite end 57 being secured to a link rod 58 which extends to the driver's seat or any convenient point for operation. On pin 28 of the standard 20′ is mounted a lever 59 having an arm 60 engaging arm 32 of lever 30. Arm 61 of lever 59 is attached by a link rod 62 to the arm 57 of lever 55. Plate 12 is secured against swinging lateral movement with respect to tractor 4 by the following construction. Mounted upon the rod 19 and between the lugs 15 and 16 is a spring 67 abutting the lug 15 and nut 68 which is fixed against longitudinal movement on the rod. This construction permits a limited movement of the trailer relative to the tractor and gives a resilient connection between tractor and trailer. Rod 19 is forked and has attached thereto rods 38 and 39 which are preferably hollow. The latter rods are connected by pivotal means to axle 40.

Referring more particularly to Figs. 5 and 6, rods 38 and 39 have at their ends members 41 bent at an angle so that one portion is substantially at right angles to the axle. These members are preferably socketed in the hollow rods and secured thereto by rivets 42, although the rods 19, 38, 39 and members 41 may be integral. By using the hollow rods 38 and 39 and separate members 41 these parts of the coupling are made renewable. At the end of members 41 are ears 43 and 44. Secured between ears 43 and 44 is a pin 45 pivotally connected to an axle attaching member 47. The axle attaching member 47, has a body of substantially U-shape with arms 48 and 49, threaded at their ends for the reception of nuts 50 and 51 and over which is placed an apertured bar, thus providing means for gripping the axle 40. Secured to the member 47 at one side thereof and preferably integral therewith is a slotted lug member 52 for receiving the pin 45, and on the side of the slot adjacent the body of member 47 is pivoted a pin 53, which is recessed at the ends 63 and 64. A lug 65 is placed adjacent the body 47 and is received within the recess 63 of pin 53. The recess 64 at the opposite end of the lever 53 is engaged by the lug 66. Alined apertures are formed in the lug 66 and lever 53 for the reception of a cotter pin 54 for locking the pin 45 in the slot. Under normal conditions a trailer secured to a tractor by my preferred coupling may move at any angle to the tractor and thus freely follow the same. If the driver desires to back he guides the tractor into a position which gives the desired angle between the tractor and trailer, moves the link 58 forward which acts upon the lever arm 57 to move the arm 56 against the arm 31 of lever 29, resulting in forcing the lever 29 against the plate 22 pressing plate 22 at this point into tight frictional contact with the plate 12. Movement of the lever arm 57 moves link 62 forward acts upon arm 61 of lever 59 and presses arm 60 against arm 32 of lever 30, thus causing the latter to press upon the plate 22 and make frictional contact with the plate 12, thus further increasing frictional engagement of the turning plates.

Referring to Figs. 7, 8 and 9 a modification of my device is shown applied to a four-wheeled trailer. Tractor 69 has mounted upon its rear axle 70, arms 71 and 72 similar in structure to arms 38 and 39 disclosed in my preferred embodiment. Attached to rods 71 and 72 is rod 73 which passes through apertures in lugs 74 and 75 depending from plate, 76. Plate 76 is comprised of diametrically positioned segmental ring portions 77 and 78. On portion 77 is mounted a standard 79 to which is pivotally attached lever 80 for engagement with an upper plate 81. Lever 80 has an upstanding arm 82 engaged by the end of the lever 83, the other end of which is secured to a link rod 84. The plate 81 is similar in form to plate 76, being comprised of segmental ring portions 85 and 86, and is pivotally mounted upon plate 76 by means of a bolt 87 which is preferably integral with plate 76. Preferably integral with plate 81 is a rod 89 forked at its ends and attached to the rear axle of the trailer by means already described. The modified form of construction is operated in the same manner as the preferred form before described, that is, rod 84 is moved forward operating lever 83 which engages lever 80 to cause frictional clutching of plate 76 and 81, and thus permitting the securing of the vehicles at any angle desired.

What I claim is:

1. A coupling, comprising in combination a frame, a bearing plate secured thereto, a second plate mounted rotatably and concentrically thereon, a frame secured to the second plate, a lug mounted on the periphery of one of the plates and extending substantially at right angles thereto, a lever pivotally mounted on said lug with the pivotal axis thereof substantially parallel to the plane of the plates, said lever having at its free end an outstanding ear, another lever pivoted on said lug with its pivotal axis substantially at right angles to the pivotal axis of said first mentioned lever and with its free end in contact with said ear.

2. A coupling, comprising in combination a frame secured to a vehicle body, a plate secured thereto, a second plate rotatably and concentrically mounted thereon, lugs secured to the periphery of said first mentioned plate and at substantially right angles thereto, levers mounted on said lugs, the pivotal axes thereof substantially parallel to the plane of said plate, outstanding ears on said levers, a second set of levers pivoted on said lugs with their pivotal axes at substantially right angles to the pivotal axes of said first mentioned levers and with one of their free ends contacting said ears, a link connecting the other free end of said last mentioned levers and a second link connected to the free end of one of the levers.

3. A coupling comprising in combination a frame secured to a vehicle body, a plate secured thereto, a second plate rotatably and concentrically mounted thereon, means for forcing the plates into frictional contact, lugs mounted on one side of said last mentioned plate, alined apertures therein, a rod mounted in said apertures for free longitudinal movement, a collar fixedly secured to said rod located between and adjacent one of said lugs, a spring abutting said lug and collar and a forked member pivotally attached to the axle of the trailer.

4. In a vehicle construction, a coupling comprising in combination a frame fixedly secured to a vehicle, a plate secured thereto, a second plate rotatably and concentrically mounted thereon means for forcing the plates into frictional contact, lugs mounted on one side of said last mentioned plate, alined apertures therein, a rod mounted in said apertures, a collar fixed to said rod and located between and adjacent one of said lugs, a spring abutting the collar and the other said lug, a forked member secured to said rod, a pin secured transversely to each arm of the fork, members secured to an axle, each member having a recessed lug therein, a bar pivoted to and lying across the mouth of said recess and means for locking said bar across said recess to secure the aforesaid pin.

In witness that I claim the foregoing I have hereunto subscribed my name this 30th day of January, 1915.

NICK W. KLINE.

Witnesses:
  MILDRED BATES,
  MARGUERITE BATES.

Copies of this patent may be obtained for five cents each, by addressing the "Commissioner of Patents, Washington, D. C."